United States Patent
Stamos et al.

(10) Patent No.: US 11,875,178 B2
(45) Date of Patent: Jan. 16, 2024

(54) USING MULTIPLE BLOCKCHAINS FOR APPLYING TRANSACTIONS TO A SET OF PERSISTENT DATA OBJECTS IN PERSISTENT STORAGE SYSTEMS

(71) Applicant: Oracle International Corporation, Redwood Shores, CA (US)

(72) Inventors: James W. Stamos, Saratoga, CA (US); Nelson Corcoran, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 347 days.

(21) Appl. No.: 16/944,011

(22) Filed: Jul. 30, 2020

(65) Prior Publication Data

US 2022/0035652 A1 Feb. 3, 2022

(51) Int. Cl.
*G06F 16/27* (2019.01)
*G06F 9/46* (2006.01)
*G06F 9/448* (2018.01)
*G06F 16/182* (2019.01)
*H04L 9/06* (2006.01)
*H04L 9/00* (2022.01)

(52) U.S. Cl.
CPC ............ *G06F 9/466* (2013.01); *G06F 9/4493* (2018.02); *G06F 16/1837* (2019.01); *G06F 16/1844* (2019.01); *H04L 9/0637* (2013.01); *H04L 9/50* (2022.05)

(58) Field of Classification Search
CPC .. G06F 16/1837; G06F 16/1844; G06F 9/466; G06F 9/4493; H04L 9/0637; H04L 9/50
See application file for complete search history.

(56) References Cited

U.S. PATENT DOCUMENTS

| 8,156,083 B2 | 4/2012 | Banerjee et al. |
| 9,384,222 B2 | 7/2016 | Banerjee et al. |
| 9,589,041 B2 | 3/2017 | Tran et al. |
| 9,747,356 B2 | 8/2017 | Lu et al. |

(Continued)

FOREIGN PATENT DOCUMENTS

WO WO2017/161275 9/2017

OTHER PUBLICATIONS

Wikipedia, the free encyclopedia, "B+ tree", https://en.wikipedia.org/wiki/B%2B_tree, last viewed on Jan. 5, 2021, 6 pages.

(Continued)

*Primary Examiner* — Tarek Chbouki
(74) *Attorney, Agent, or Firm* — Hickman Becker Bingham Ledesma LLP; Marcel K. Bingham

(57) ABSTRACT

A ledgered repository of persistent data objects is replicated on a network of persistent storage systems (PSSs) by transactions recorded across multiple blockchains. The blockchains are replicated on each of the PSSs. Using multiple blockchains enables greater parallelism; however, use of the multiple blockchains requires using measures that ensure that transactions distributed across multiple blockchains are applied in way that ensures a level of transactional consistency. Furthermore, the measures are efficient, thereby reducing overhead of maintaining a level of transactional consistency and increasing throughput of applying the transactions using multiple blockchains.

14 Claims, 9 Drawing Sheets

(56) References Cited

U.S. PATENT DOCUMENTS

| | | | |
|---|---|---|---|
| 9,767,178 | B2 | 9/2017 | Srivastava et al. |
| 9,830,372 | B2 | 11/2017 | Rajamani et al. |
| 9,904,722 | B1 | 2/2018 | Shevade et al. |
| 10,191,932 | B2 | 1/2019 | Lehouillier |
| 10,616,324 | B1* | 4/2020 | Kaddoura ............ A61F 2/4455 |
| 2002/0095408 | A1 | 7/2002 | Cheng |
| 2014/0379679 | A1 | 12/2014 | Kohno |
| 2016/0224604 | A1* | 8/2016 | Petculescu ............ G06F 16/275 |
| 2017/0123846 | A1* | 5/2017 | Gschwind ............ G06F 9/5077 |
| 2017/0228371 | A1 | 8/2017 | Seger, II |
| 2017/0352012 | A1* | 12/2017 | Hearn ................... H04L 9/3239 |
| 2018/0096163 | A1 | 4/2018 | Jacques et al. |
| 2018/0152289 | A1* | 5/2018 | Hunt ..................... H04L 9/0637 |
| 2018/0374086 | A1* | 12/2018 | Ardashev .............. H04L 9/3247 |
| 2019/0156332 | A1* | 5/2019 | Christidis .......... G06Q 20/3829 |
| 2019/0179939 | A1 | 6/2019 | Govindarajan et al. |
| 2019/0238525 | A1 | 8/2019 | Padmanabhan et al. |
| 2019/0342149 | A1 | 11/2019 | Guo et al. |
| 2019/0356674 | A1 | 11/2019 | Irazabal et al. |
| 2019/0370793 | A1 | 12/2019 | Zhu et al. |
| 2019/0378134 | A1* | 12/2019 | Asari ........................ G06F 9/06 |
| 2020/0050613 | A1 | 2/2020 | Gauvreau, Jr. |
| 2020/0142992 | A1 | 5/2020 | Ocher et al. |
| 2020/0167243 | A1 | 5/2020 | Rauh et al. |
| 2020/0250177 | A1 | 8/2020 | Padmanabhan |
| 2020/0327545 | A1* | 10/2020 | Xie ........................... G06F 9/52 |
| 2020/0364201 | A1* | 11/2020 | Cseri ..................... G06F 16/235 |
| 2020/0374106 | A1 | 11/2020 | Padmanabhan |
| 2021/0014042 | A1 | 1/2021 | Sivathanu et al. |
| 2021/0073209 | A1 | 3/2021 | Loaiza et al. |
| 2022/0092083 | A1 | 3/2022 | Grimaldi et al. |

OTHER PUBLICATIONS

Ezhilchelvan et al., "Non-Blocking Two Phase Commit Using Blockchain", 1st Workshop on Cryptocurrencies and Blockchains Distributed Systems, CryBlock'18, dated Jan. 1, 2018, pp. 36-41.

Anonymous: "Learning Key 20c New Features for Database Administrators", Details: Oracle Blockchain Table, dated Feb. 14, 2020, 4 pages.

Wikipedia.com, "Two-Phase Commit Protocol", Wikipedia, The Free Encyclopedia, https://en.wikipedia.org/w/index.php?title=two-phase_commit_protocol&oldid=886121497, dated Mar. 2019, 9 pages.

Wikipedia.com, "Raft (Algorithm)", Wikipedia, The Free Encyclopedia, https://en.wikipedia.org/w/index.php?title=raft_(computer_science)&oldid=895121718, dated May 2019, 7 pages.

Cucurull et al., "Distributed Immutalilization of Secure Logs", dated Sep. 17, 2016, Big Data Analytics in the Social and Ubiquitous Context, 16 pages.

Anonymous: "Two-Phase Commit Protocol—Wikipedia", dated Mar. 4, 2019, https://en.wikipedia.org/w/index.php?title=Two-phase_commit_protocol&oldid=886121497, retrieved on Sep. 28, 2020, 10 pages.

Anonymous: "Raft (computer science)—Wikipedia", dated May 2, 2019, https://en,wikipedia.org/w/index.php?title=Raft_computer_science)&oldid=895121718, dated Sep. 28, 2020.

Wang et al., "Formal Specification and Verification of Smart Contracts in Azure Blockchain", dated Apr. 29, 2019, 13 pages.

Samaniego et al., "Blockchain as a Service for IoT", 2016 IEEE International Conference on Internet of Things (iThings), 4 pages.

Rimba et al., "Comparing Blockchain and Cloud Services for Business Process Execution", dated n 2017, 4 pages.

Ellis et al., "ChainLink A Decentralized Oracle Network", dated Sep. 4, 2017, 38 pages.

Allen et al., "Veritas: Shared Verifiable Databases and Tables in the Cloud", CIDR'19, dated Jan. 2019, CA, 9 pages.

Stamos, U.S. Appl. No. 16/932,633, filed Jul. 17, 2020, Non-Final Rejection, dated Mar. 29, 2022.

Stamos, U.S. Appl. No. 16/932,633, filed Jul. 17, 2020, Notice of Allowance and Fees Due, dated Jan. 19, 2023.

Stamos, U.S. Appl. No. 16/932,633, filed Jul. 17, 2020, Notice of Allowance and Fees Due, dated Oct. 6, 2022.

Loaiza, U.S. Appl. No. 16/923,279, filed Jul. 8, 2020, Notice of Allowance and Fees Due, dated Dec. 7, 2022.

Loaiza, U.S. Appl. No. 16/923,279, filed Jul. 8, 2020, Notice of Allowance and Fees Due, dated Nov. 16, 2022.

Loaiza, U.S. Appl. No. 16/923,279, filed Jul. 8, 2020, Notice of Allowance and Fees Due, dated Jan. 5, 2023.

Loaiza, U.S. Appl. No. 16/923,279, filed Jul. 8, 2020, Advisory Action, dated Sep. 29, 2022.

"16.9 Using Flashback Data Archive", Oracle Database Development Guide, 12c Release 1 (12.1), May 2016, 4 pages.

Muzammal et al., "Renovating Blockchain with Distributed Databases: An Open Source System", Future Generation Computer Systems, Jul. 23, 2018, 27 pages.

Loaiza, U.S. Appl. No. 16/923,279, filed Jul. 8, 2020, Notice of Allowance and Fees Due, dated Mar. 9, 2023.

Stamos, U.S. Appl. No. 17/308,906, filed May 5, 2021, Notice of Allowance and Fees Due, dated Jul. 18, 2022.

Loaiza, U.S. Appl. No. 16/923,279, filed Jul. 8, 2020, Final Rejection, dated Jul. 26, 2022.

* cited by examiner

TC BLOCK 301

Block Record Set 302

Transaction Context 310
- Database Operations 312
- Write Set 314
- Distributed TXID 316 "478810"
- BOLIT 320 "11:00"
- TxnPromTime 322 "11:10"

Write Set 314'

| | PK 342 | RowPromTime 344 | RowLDTXID 346 | RowVersion 348 | OtherColumns 350 |
|---|---|---|---|---|---|
| row 330 prev | pk1 | 10:40 | 459799 | 3 | |
| row 330 new | pk1 | 11:10 | 478810 | 4 | |
| row 332 prev | pk2 | 11:05 | 460011 | 8 | |
| row 332 new | pk2 | 11:10 | 478810 | 9 | |

USING MULTIPLE BLOCKCHAINS FOR APPLYING TRANSACTIONS TO A SET OF PERSISTENT DATA OBJECTS IN PERSISTENT STORAGE SYSTEMS

FIELD OF THE INVENTION

The present invention relates to enterprise-level persistent storage systems, such as a file system, database management systems, key-value store systems, document store systems, and in particular, implementing blockchain technology natively within an enterprise-level persistent storage system.

BACKGROUND

Traditional persistent storage systems can handle large volumes of data that are read and/or modified by multiple concurrent users. Enterprise-level persistent storage systems (hereafter PSS) maintain data integrity, consistency, and security for the persistent data managed by the PSS.

A PSS may be, for example, a database managed by a DBMS, files stored in a file system, key-value objects managed by a key-value store system, or documents (e.g. JSON or XML documents) managed by a document storage system (DOCS). A PSS stores data in persistent data objects. A set of persistent data objects may be, for example, rows in a database table managed by a DBMS, key-value pairs managed by a key-value store system, a set of documents managed by a DOCS, or a file managed by a file system. A persistent data object may be a composite data object, comprising multiple persistent data objects. For example, in a DBMS, a database table may comprise multiple rows as persistent data objects. In a file system, a file may comprise multiple blocks as persistent data objects, a directory may be a persistent data object that contains files and even contains other directories as persistent data objects. In a DOCS, a persistent data object may be a collection of JSON documents.

Various kinds of PSSs, such as DBMSs and key-value store systems, provide superior performance for updating and querying the PSS. Users of a PSS may rely on the validity of persistent data objects stored in a PSS because changes to the data objects are controlled by a centralized authority such as a company or organization. Generally, any changes made to the data stored in a PSS are made by users belonging to the same central authority, and are therefore subject to its access policies.

It is becoming increasingly important for separated entities (e.g., businesses, organizations, governments) to share read and write access to mission-critical shared data in a way that the entities may rely on the validity of the shared data. Such data is referred to herein as distributed ledgered data.

An approach for implementing distributed ledgered data is the blockchain apply approach. In this approach, the distributed ledgered data is replicated as persistent data objects in a "ledgered repository of objects" at each of the PSSs. Changes to the persistent data objects ("ledgered object") are made by a transaction initiated but not committed at one of the PSSs ("initiator PSS"). The transactions and the respective changes are recorded within a block added to a blockchain that is replicated across each of the PSSs. Other PSSs read the information about the transactions from blocks in the blockchain and replay the respective changes to the replicas of the persistent data objects at each of the other PSSs. The term replay means that the changes are made without committing the changes. The changes are "approved" by the other PSSs. Once approved the PSSs commit the changes. Activity regarding the approval of changes is recorded in the blocks in the blockchain.

As shown above, the blockchain apply approach uses a blockchain to propagate changes to a ledgered repository of objects. An issue regarding the use of a blockchain to propagate the changes stems from the fact that adding blocks to a blockchain is a serial operation requiring participation by multiple PSSs to add the block and to approve a transaction. The serial nature of these operations encumbers throughput for replicating the ledgered repository of objects at the PSSs, and particular, encumbers the ability to apply transactions in parallel to replicate the transactions among the PSSs.

BRIEF DESCRIPTION OF THE DRAWINGS

In the drawings:

FIG. 3 is a diagram depicting blocks in a blockchain according to an embodiment of the present invention.

DETAILED DESCRIPTION

Figure 1A:
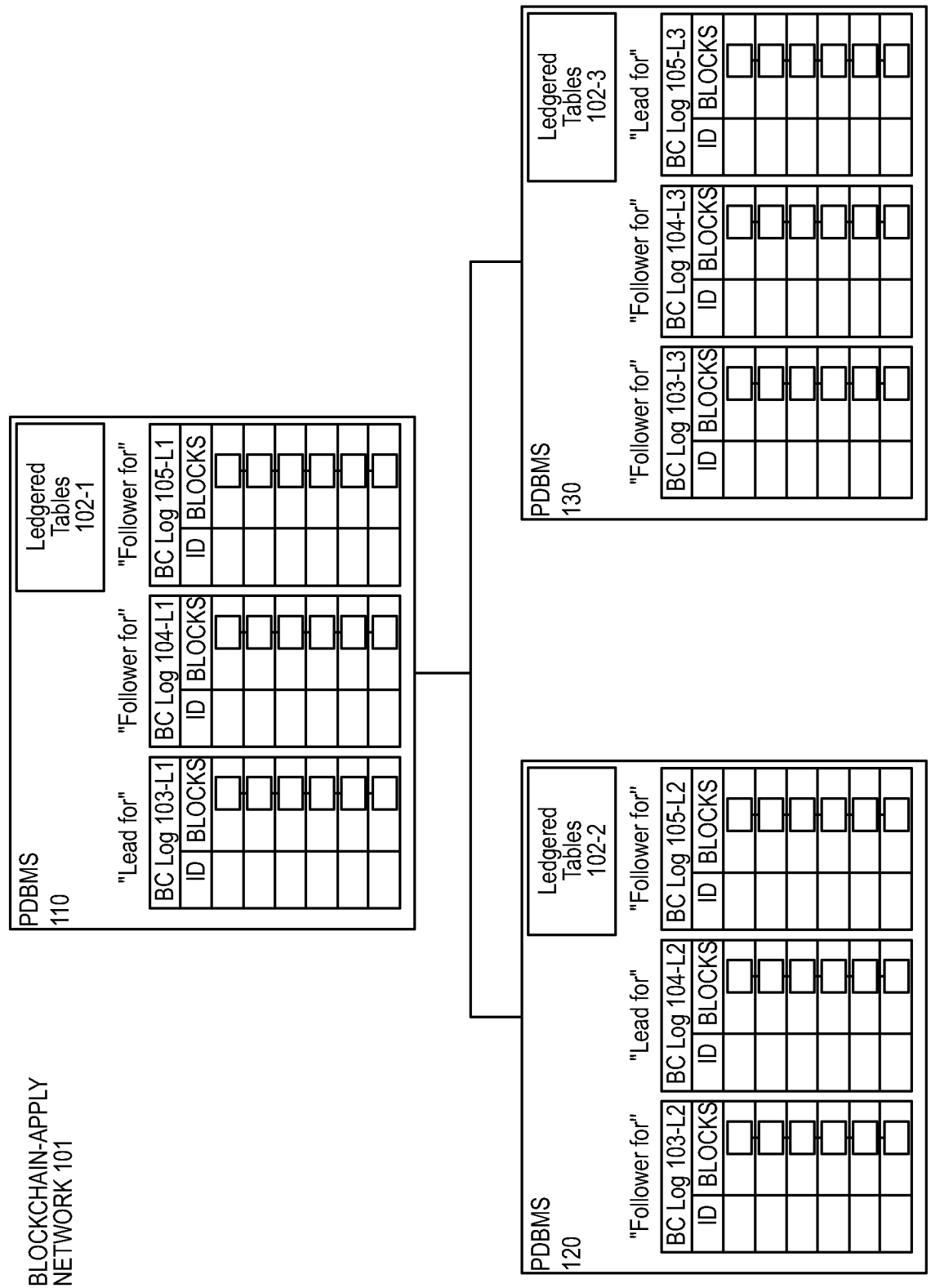
FIG. 1A is a diagram depicting a blockchain apply network according to an embodiment of the present invention.

In the following description, for the purposes of explanation, numerous specific details are set forth in order to provide a thorough understanding of the present invention. It will be apparent, however, that the present invention may be practiced without these specific details.

General Overview

Described herein are approaches for replicating a ledgered repository of persistent data objects on a network of PSSs using blockchain apply that enable greater parallism for replicating the changes using blockchain apply. Such an approach is referred to herein as the aggregated blockchain apply because the approaches rely on an aggregated blockchain. An aggregated blockchain comprises multiple blockchains that are each replicated on each PSS in a network of PSSs. Any of the PSSs may be used to approve and replicate transactions to a ledgered repository of persistent data objects. Each blockchain of an aggregated blockchain is referred to herein as a member blockchain or simply a blockchain.

Separate transactions to a persistent data object in a ledgered repository may be processed through different member blockchains. In fact, as explained later, information regarding approval by each PSS of a single replicated transaction may be recorded in a separate block that may be in separate member blockchains. Hence information about a single replicated transaction may be recorded in different member blockchains.

Under aggregated blockchain apply, the history of transactions of a ledgered repository is recorded across the member blockchains. The member blockchains may be merged in an appropriate order to provide historically ordered information about transactions made to the ledgered repository. In effect, the aggregated blockchain is a single logical blockchain that records historically ordered information about the transactions. Hence, the member blocks chains are collectively referred to herein as an aggregated blockchain.

In an embodiment, adding blocks to an individual member blockchain remains a serial operation which encumbers throughput for applying transactions in parallel through an individual member blockchain. However, replicating transactions across multiple member blockchains enables more transactions to be applied in parallel.

When applying transactions in parallel to replicate transactions to any PSS in the network, the application of the transactions must be scheduled or otherwise ordered in a way that that is consistent with transactional dependency. Consistency with transactional dependency requires resolving the transactional dependency of each transaction to apply, a process that can entail overhead. The overhead is compounded when more transactions are to be applied in parallel. Thus, the more efficiently transactional dependency can be resolved, the greater the throughput and scalability for applying transactions. Described herein are approaches for resolving transactional dependency more efficiently.

Transaction Processing

In transaction processing, changes to persistent data objects are made by transactions. A transaction is a set of operations that change persistent data objects. All the changes for a transaction are made atomically. The changes are made permanent by committing the transaction. If the transaction is aborted or otherwise not committed, the transaction is rolled back.

In distributed transaction processing, multiple PSS participants commit a distributed transaction to change respective data objects using a phased approach that is managed by a transaction manager. The phased approach includes at least a phase in which the participants reach a prepared state. When in a prepared state for a transaction, the participant has performed the operations needed to reach a state where the participant can guarantee to be able to commit the transaction but has not yet committed the transaction. A participant may be instructed to reach the prepared state by the transaction manager and communicate to the transaction manager whether the participant has reached the prepared state. A distributed transaction that changes a persistent data object in a ledgered repository may be referred to herein as a blockchain transaction.

Transaction processing, as the term is used herein, also requires journaling. In journaling, changes made by a transaction to a persistent data object are stored in a persistent journal. A persistent journal comprises journal records that record changes made by a transaction to a persistent data object. Each record may specify what field, column, elements, or portion of a data object were changed and the new values thereof created by the change. The old values that were replaced by the new values may also be specified.

In write-ahead journaling, journal records for changes made by a transaction are stored persistently before committing a transaction and/or to reach a prepared state. In addition, the journal can be read by other PSS to replicate persistent data objects.

Transactional Dependency

According to an embodiment, applying transactions in parallel is done in a way that is consistent with transactional dependency on a persistent data object level. A particular transaction has transactional dependency on a persistent data object level on another transaction when the other transaction adds or modifies a persistent data object before the particular transaction modifies the persistent data object, based on the commit times of the transactions. To apply the particular transaction consistently with transactional dependency on a persistent data object level basis, the particular transaction is applied only after applying any other transaction for which the particular transaction has a transactional dependency. Hence forth, when the term transactional dependency is used, the term refers to transactional dependency that is at the persistent data object level, unless otherwise specified.

For example, a transaction TA that changes a row in a table in a source database commits before a transaction TB that changes the same row commits. Because transaction TA commits a change to the same row before transaction TB commits, transaction TB has a transactional dependency on transaction TA. To apply these transactions in a destination database in a way that is consistent with transactional dependency, transaction TA must be applied in the destination database before transaction TB is applied.

Another example of a different level of transactional dependency is database level. Under a database-level transactional dependency, transactions are applied in the order in which the transactions were committed against any database object (e.g. row) in the database.

For example, a transaction TA that changes a row A in a table in a source database commits before a transaction TB that changes a different row B in the table commits. To replicate these transactions in a destination database according to database level transactional dependency, transaction TA is applied in the destination database before transaction TB even though transactions changed different rows.

When transactions from a source database are applied to a destination database at a database level of transactional consistency, the source database and destination database may transition through the same sequence of database states. On the other hand, when these transactions are applied at a persistent data object level of consistency, the source database and destination database may not transition through the same sequence of database states.

For example, a transaction TA that changes a row A in a table in a source database commits before a transaction TB that changes a different row B in the table commits. To replicate these transactions in the destination database in a way that is consistent with persistent data object level transactional dependency, transaction TB may be applied in the other database before transaction TA is applied. This may put the destination database in a database state that did not exist in the source database.

Aggregated Blockchain Apply in a Replicated DBMS

Aggregated blockchain apply is described within the context of a DBMS. However, aggregated blockchain apply may be used in other types of PSSs that have the capability to make changes using distributed transaction processing.

In the context of a DBMS, a ledgered repository of persistent data objects comprises rows in a ledgered set of replicated database tables. Each of the ledgered tables is referred to a ledgered database table or ledgered table. The set of ledgered database tables is replicated at each of the DBMSs. Transactions to any of the database tables at a DBMS are recorded within a block in the aggregated blockchain, and in particular, a member blockchain that is replicated across each of the DBMSs. A DBMS reads the changes from a member blockchain and applies the transactions to the respective replicas of the set of ledgered database tables.

The set of multiple DBMSs that each participate in aggregated blockchain apply to replicate a particular ledgered table are collectively referred to herein as a blockchain apply network ("BCA network"). Each DBMS in the BCA network may simply be referred to herein as a participant DMBS (PDBMS). The changes that can be replicated using blockchain apply include DML (Database Manipulation Language) changes, which are changes that change data in the ledgered table or DDL (Database Definition Language) changes, which include changes that change a database dictionary to effect a change to a BCA network, including a structure of a ledgered table.

A replica of the ledgered set of database tables and each of the member blockchains is stored and maintained on each PDBMS. Thus, if an aggregated blockchain comprises three member blockchains, each PDBMS includes a replica of each of the three member blockchains.

According to an embodiment, a blockchain transaction to one or more ledgered tables is initiated by a single initiator PDBMS. The initiator PDBMS is a leader of a member blockchain, which the initiator PDBMS uses to propagate changes made by the transaction to other PDBMSs. A leader of a blockchain is responsible for proposing blocks to add to the member blockchain, as described further in U.S. patent application Ser. No. 16/932,633, *Native Persistent Store Support For Blockchains*, filed by James Stamos, et al. on Jul. 17, 2020, the entire contents of which are incorporated by reference.

For purposes of exposition, a member blockchain for which a PDBMS is a leader is referred to as the PDBMS's member blockchain or a member blockchain of the PDBMS. According to an embodiment, with respect to a member blockchain, PDBMSs alternate the leadership of a blockchain on a frequent and/or regular basis. At any point in time, a PDBMS may be a leader for zero or more member blockchains.

For the blockchain transactions initiated by an initiator PDBMS, the initiator PDBMS coordinates replicating the transactions with the other PDBMSs through the initiator PDBMS's member blockchain. The other PDBMSs are referred to herein as follower PDBMSs with respect to the member blockchain and the transactions initiated by the initiator PDBMS.

PDBMSs are described herein as adding a block to a blockchain. Adding a block to a blockchain requires the participation of PDBMSs, which each permanently append a block to their respective replicas of the member blockchain according to a consensus protocol, which shall be described later and which is described in detail in *Native Persistent Store Support For Blockchains*.

A database application client may request execution of a transaction that changes a ledgered table by simply issuing a DML statement to a PDBMS through a database session established with the PDBMS. The PDBMS becomes the initiator PDBMS for the transaction.

According to an embodiment, aggregated blockchain apply replicates transactions to a set of ledgered tables made by an initiator PDBMS. The transactions are replicated at the follower PDBMS using a variant of a two-phase commit that begins when the initiator PDBMS of a transaction receives a request to commit the transaction. In the first phase, the prepare-to-commit phase, the initiator PDBMS adds a block to a member blockchain for which the initiator PDBMS is a leader. The block specifies the changes made by the transaction. As a result, each of the PDBMSs include the block in their respective replica of the member blockchain.

Each of the follower PDBMSs replays the changes specified in the block without committing the changes. Based on the results of replaying changes, a follower PDBMS votes to commit or not to commit the transaction. Then each of the follower PDBMSs record their vote in a block that is added to a respective member blockchain of the follower PDBMS. As a result, there are multiple blocks in multiple member blockchains recording a vote to commit or not commit a transaction.

The initiator PDBMS reads these blocks from its local replicas of the multiple member blockchains to read the votes of each of the follower PDBMSs. Based on the votes read, the initiator PDBMS determines a commit consensus outcome according to a consensus algorithm.

In the second phase, if the commit consensus outcome is to commit, the initiator PDBMS commits the transaction locally and adds a block that records the commit consensus outcome to commit to a member blockchain of the initiator PDBMS. The follower PDBMSs read the consensus commit outcome that is recorded in the block in their respective replica of the initiator PDBMS's member blockchain and commit the transaction locally. If the commit consensus outcome is to not commit, the initiator PDBMS aborts the blockchain transaction, and each follower PDBMS that executed the blockchain transaction aborts the transaction locally.

As shall be explained in greater detail, a blockchain is stored in a log comprised of log records, each log record storing a block. Blocks are proposed to be added by proposing log records that each contain a block.

In general, BCA participants reach a consensus by following a consensus algorithm. A consensus algorithm is used to reach a consensus on whether to accept the proposals and then act upon the proposal when the consensus is to accept the proposal. A proposal may be to add a proposed log record (which includes a block) to a log, or to take another kind of action.

In a log-based consensus algorithm, participants reach a consensus on appending log records to a log, and in particular, on the order in which the log records are appended and what the contents of each log record should be. A replica of the log is maintained by each of the participants. In blockchain apply, each log record stores a block in the blockchain and the order of the block in the blockchain mirrors the order of the log records.

Aggregated blockchain apply is implemented as a native feature of a PDBMS. A blockchain network is created and configured by issuing DDL commands to each PDBMS. Changes to a ledgered table and associated blockchain are integrated into the native transaction and replication capability of a PDBMS, including the capability to replicate the changes in parallel. Performance can be monitored using available PDBMS tools. Database applications may be programmed to read and write to ledgered tables in the same way the applications are configured to read and write to traditional tables. No external data structures (i.e. external to a PDBMS) are needed to implement a ledgered table and its associated blockchain.

Illustrative BCA Network

FIG. 1A depicts a BCA network 101, a BCA network according to an embodiment of the present invention. Referring to FIG. 1A, BCA network 101 includes PDBMS 110, PDBMS 120, and PDBMS 130.

Figure 1B:
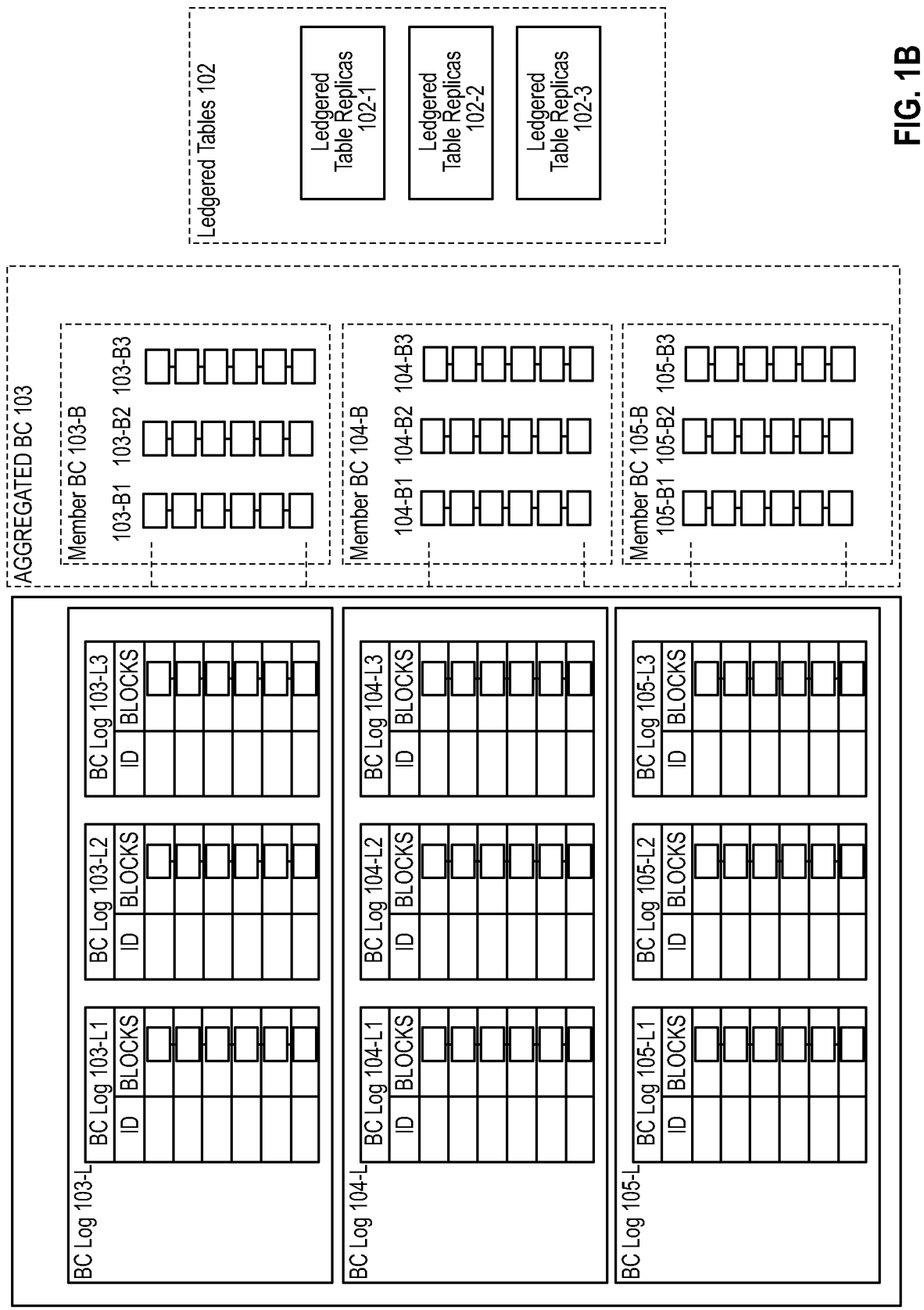
FIG. 1B is a diagram depicting data structures used in an embodiment of the present invention.

BCA network 101 uses aggregated blockchain apply to maintain a set of ledgered tables. Using aggregated blockchain apply entails each of PDBMS 110, PDBMS 120, and PDBMS 130 maintaining replicated data structures, such as ledgered tables and member blockchains. FIG. 1B is an organizational view that shows replicated data structures and the replicas logically contained therein without depicting which participant hosts the replica.

Referring to FIG. 1B, it depicts aggregated BC 103, which is an aggregated blockchain comprising three member blockchains member BC 103-B, member BC 104-B, and member BC 105-B. Each of member BC 103-B, member BC 104-B, and member BC 105-B includes replicas, which are replica member blockchains 103-B1, 103-B2, & 103-B3, 104-B1, 104-B2, & 104-B3, and 105-B1, 105-B2, & 105-B3, respectively.

The blockchains are used to replicate changes to ledgered tables 102. Ledgered tables 102 comprises three replicas, which are ledger table replicas 102-1, 102-2, and 102-3. Other tables are not depicted.

Blockchains are stored in blockchain logs (BC log) comprising BC log records. Each log record stores a block in a blockchain. According to an embodiment, a BC log is a database table that includes at least one column for storing a blockchain, each row (BC log record) of the BC log storing a block of the blockchain.

FIG. 1B depicts BC-Log 103-L, BC-Log 104-L, and BC-Log 105-L. Each of BC-Log 103-L, BC-Log 104-L, and BC-Log 105-L comprise three replicas. The replicas of BC-Log 103-L, BC-Log 104-L, and BC-Log 105-L comprise BC-Log 103-L1, BC-Log 103-L2, & BC-Log 103-L3, BC-Log 104-L1, BC-Log 104-L2, & BC-Log 104-L3, and BC-Log 105-L1, BC-Log 105-L2, & BC-Log 105-L3, respectively; these BC log replicas store member blockchain replicas 103-B1, 103-B2, & 103-B3, 104-B1, 104-B2, & 104-B3, and 105-B1, 105-B2, & 105-B3, respectively.

Each log record includes a log identifier (log ID), which uniquely identifies the log record in a log. Each replica of a log record includes the same log ID. Log IDs are ordered such that the log ID of a log record is greater than that of any other log record that holds an earlier block in the blockchain stored in the ledger.

In an embodiment, log IDs in a BC log are monotonically increasing number values, such as an integer. With respect to a blockchain stored in the BC log, the log ID of a log record in the BC log represents the block position of the block contained in the log record, where the block position is the position of the block in the blockchain. For example, a log record having a log ID 0 stores the genesis block in the respective blockchain, a log record having log record ID 1 stores the second block in the respective blockchain, and so forth.

FIG. 1A depicts how the above described replicas are hosted across BCA network 101. PDBMS 110 hosts ledgered table replicas 102-1 and BC Log 103-L1, 104-L1, and 105-L1. PDBMS 120 hosts ledgered table replicas 102-2 and BC Log 103-L2, 104-L2, and 105-L2, and PDBMS 130 hosts ledgered table replicas 102-3 and BC Log 103-L3, 104-L3, and 105-L3.

As mentioned before, each of the PDBMSs of BCA network 101 is a leader of a member blockchain that they use to replicate transactions to other PDBMSs of BCA network 101, while other PDBMSs are followers for that member blockchain. A leader or follower of a member blockchain is also referred to as a leader or follower of the BC log that contains the member blockchain. For example, PDBMS 110 is the leader for BC Log 103-L and member blockchain 103-B, while PDBMSs 120 and 130 are followers.

Additional Terminology for Consensus Driven Action

Various operations by BCA network 101 or any of its participants are described as performing an action according to or by using a consensus algorithm. As mentioned previously, a consensus algorithm entails that the participants in the algorithm follow a protocol for the algorithm, which may require such steps as an initiator PDBMS transmitting a proposal (e.g. proposed log record and log ID), other PDBMSs receiving the proposal and responding to the proposal by voting to accept or reject the proposal, the initiator PDBMS determining the consensus outcome based on the votes received according to the log-based consensus protocol, and then the initiator PDBMS transmitting the consensus outcome to the participants. When voting, accepting, rejecting, or when an operation is described as being performed according to or by using a consensus algorithm, it may be assumed that participants perform actions required by and according to the protocol.

As shall be explained in greater detail, BCA participants follow a consensus algorithm to determine whether to commit a blockchain transaction. As mentioned previously, the consensus outcome for committing the blockchain transaction is referred to as a commit consensus outcome. The acceptance or rejection of a proposal to commit a distributed transaction by a follower PDBMS is referred to herein as a vote to commit or not to commit, respectively.

Log-Based Consensus Algorithms

According to an embodiment, BCA network 101 uses a log-based consensus algorithm that is initiator-based to control whether PDBMSs add log records to a BC log. In general, a log-based consensus algorithm that is initiator based requires a leader PDBMS to make proposals to follower PDBMSs to append log records to a log and to manage consensus among the PDBMSs on whether to accept the proposals.

In response to the initiator PDBMS sending a message to propose a log record, the other PDBMSs determine to accept or reject the proposal and communicate the determination to the initiator PDBMS. The PDBMSs determine whether the proposal was accepted or rejected based on one or more consensus criteria, which is based at least in part on how many of the PDBMSs accept or reject the proposal. The determination is referred to herein as the consensus outcome. An example of a consensus criterion is that a quorum of the PDBMSs accepts a proposed log record. The initiator PDBMS communicates the consensus outcome to the other PDBMSs.

A PDBMS communicates acceptance of a proposal in several ways. One is to send a digitally signed message to the initiator PDBMS that specifies that the PDBMS accepts or rejects the proposal.

When the consensus outcome is to add the block to a member blockchain, the block is permanently appended to each replica of the member blockchain at each of the PDBMSs. When a PDBMS or BCA network is described herein as adding a block to a member blockchain or adding a log record containing the block to a BC log, the log record including the block is added to the respective local replicas of the PDBMS's BC logs. Any PDBMS can later read and access a log record and/or block to perform processing based on information in the block. Further details about adding a block to a blockchain and a log record to a BC log are described in *Native Persistent Store Support For Blockchains*.

Aggregated Blockchain Apply Replication Overview

Figure 2:
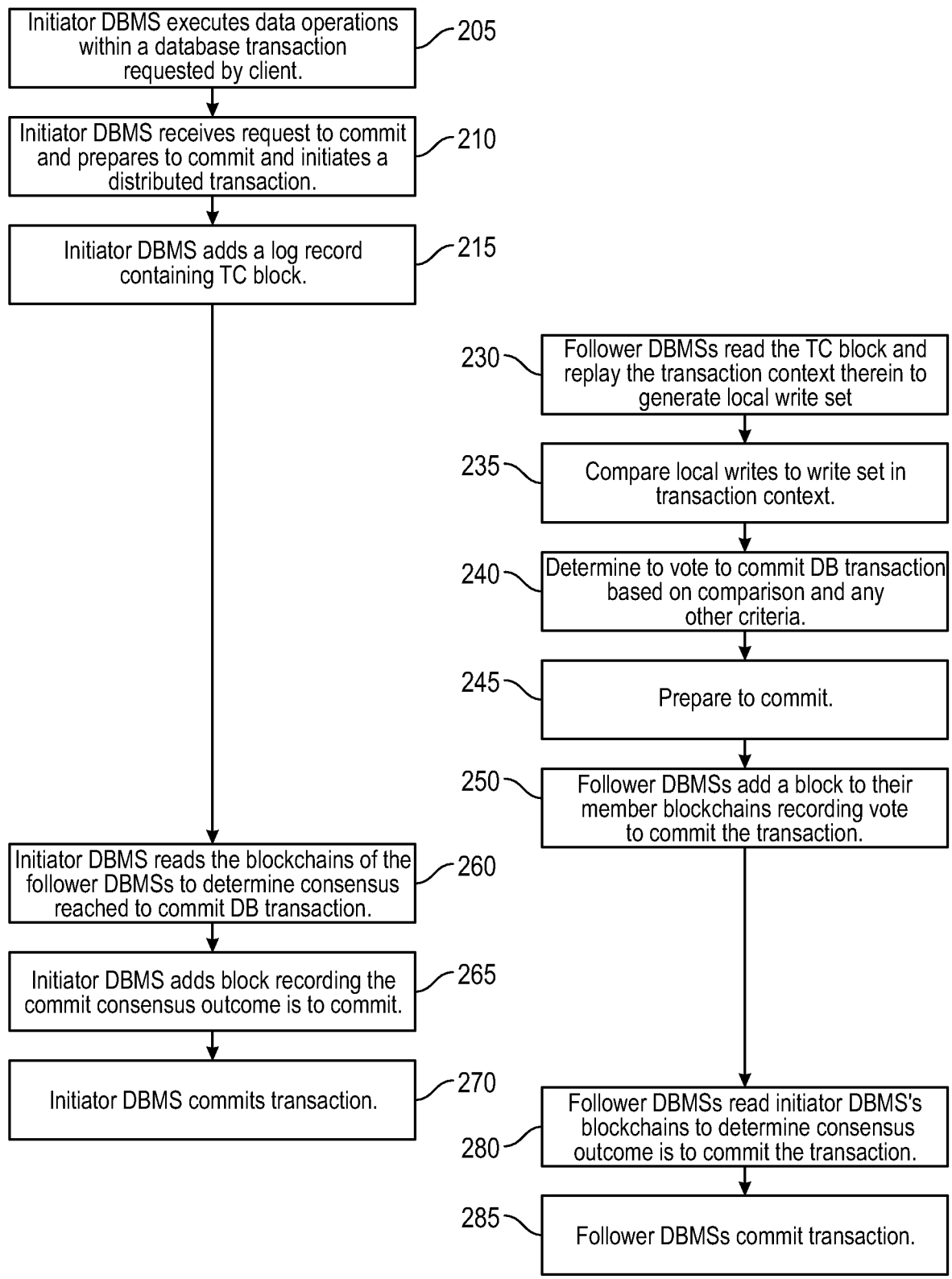
FIG. 2 is a diagram depicting a blockchain apply procedure according to an embodiment of the present invention.

FIG. 2 is a flowchart depicting a procedure for aggregated blockchain apply according to an embodiment of the present invention. The procedure replicates DML changes to a ledgered table across a BCA network.

The flowchart depicts a normal course of operations where DML changes made by a transaction are replicated using aggregated blockchain apply without encountering error conditions or exceptions. Handling error conditions and exceptions are described in *Native Persistent Store Support For Blockchains*. The operations are illustrated in a scenario involving replicating a blockchain transaction for which PDBMS 110 is the initiator PDBMS and PDBMS 120 & 130 are follower PDBMSs. The blockchain transaction is initiated by a database client that has established a database session with initiator PDBMS 110.

Referring to FIG. 2, initiator PDBMS 110 executes database operations within the blockchain transaction against ledgered table 102-1 (205). Such database operations include execution of one or more database statements, including DML statements and one or more blockchain procedures. The database operations may include save points, or even rollbacks. A blockchain procedure is a computer executable procedure or function, the implementation of which is accepted by and visible to a member of BCA network 101, and which is executed by a PDBMS of BCA network 101 to modify a ledgered table. Blockchain procedures are further described in *Native Persistent Store Support For Blockchains*.

Initiator PDBMS 110 receives from the client a request to commit the database transaction. In response, initiator PDBMS 110 initiates a blockchain transaction and prepares to commit the blockchain transaction as part of a two-phase commit and becomes prepared to commit. (210)

A blockchain transaction changes a database in each of multiple participating PDBMSs. The changes at each PDBMS are made by a local transaction initiated and/or executed by a PDBMS to change data at the PDBMS as part of the blockchain transaction. The initiator PDBMS assigns a distributed transaction id ("distributed txid"). The local transaction is referred to as a branch transaction of the blockchain transaction. Each PDBMS assigns a local transaction id to the respective branch transaction and associates the local transaction id with the distributed txid.

The execution, commitment, and termination of the distributed transaction may be coordinated by the initiator PDBMS. In a preferred embodiment, the commitment of a blockchain transaction is started by the initiator PDBMS, but the actual commitment and termination of the blockchain transaction are done in a decentralized manner as explained later. According to another embodiment, a distributed transaction is executed using the distributed transaction protocol specified in the X/Open XA specification. Under this protocol, an initiator PDBMS is a transaction manager of the distributed transaction.

Initiator PDBMS 110 adds a "TC block" that includes a transaction context to initiator PDBMS 110's member blockchain which is member BC 103-B. A transaction context includes a specification of the database operations executed for the branch transaction by the initiator PDBMS and a "write set" for the one or more rows changed from executing these database operations. The write set in the proposed TC block is referred to herein as a proposed write set. The TC block may include other information, such as the distributed txid for the blockchain transaction. Contents of a TC block are described later in further detail.

Follower PDBMS 120 and 130 read the TC block from member BC 103-B and replay the transaction context (i.e., execute the sequence of database operations specified by the specification in the transaction context) within a branch transaction initiated by follower PDBMS 120 and 130 to generate a local write set. (230) A comparison of the local write set with the proposed write set determines, at least in part, whether follower PDBMS 120 and 130 will vote to commit the distributed transaction. Follower PDBMS 120 and 130 initiate a local transaction to replay the transaction context in the TC block to generate a local write set. The local write set is compared to the proposed write set (235).

Follower PDBMS 120 and 130 determine to vote to commit the proposed database transaction based on a comparison of the local write set to the proposed write set (240). Generally, in determining whether to vote to commit the distributed transaction, follower PDBMS 120 and 130 determines whether one or more DML commit criteria are satisfied. DML commit criteria includes whether the proposed write set matches the local write set, and if so, whether one or more other criteria, if any, are satisfied. Rows of a write set should include the primary key of the ledgered table or a similarly unique identifier to ensure replicas of the same rows can be matched for comparison. A set comparison is used when determining whether the proposed write set and the local write set match. The order in which rows in the local write set are inserted and the order in which rows in the proposed write set are inserted do not affect the comparison For example, the set {A, B, C} is equal to the set {A, C, B} because both sets have the same three elements.

Next, follower PDBMS 120 and 130 prepare to commit the proposed DB transaction (245). After preparing to commit, follower PDBMS 120 and 130 vote to commit the blockchain transaction, recording their vote in separate blocks that PDBMS 120 and 130 add to their respective member blockchains BC 104-B and 105-B. (250)

Initiator PDBMS 110 reads the blocks recording the votes of PDBMS 120 and 130 from BC 104-B and 105-B, respectively. Based on the votes, initiator PDBMS 110 determines the commit consensus outcome is to commit the blockchain transaction. (260) In response to this determination, initiator PDBMS 110 adds a block to member BC 103-B that records that the commit consensus outcome for the blockchain transaction is to commit (265) and then commits the blockchain transaction, which includes committing the respective local transaction of initiator PDBMS 110 for the distributed transaction.

Follower PDBMS 120 and 130 read the block from member BC 103-B that records the commit consensus outcome to commit the distributed transaction. In response to determining the commit consensus outcome, follower PDBMS 120 and 130 commit their respective local transactions for the distributed transaction.

In an embodiment of the present invention, a follower PDBMS may not have replayed a blockchain transaction or committed the blockchain transaction locally but may learn that the commit consensus outcome for the blockchain transaction is to commit. The follower PDBMS (1) can either replay the database operations in the blockchain transaction and verify the local write set and proposed write set are the same, or (2) the follower PDBMS can ignore the database operations and replay the individual changes in the write set. A PDBMS that behaves as in (1) is referred to as a transaction approver while a PDBMS that behaves as in (2) is referred to as a transaction copier. An advantage of being a transaction copier is that copying avoids any nondeterminism that may be present in the original database operations in the blockchain transaction.

The aggregated blockchain apply procedure depicted in FIG. 2 uses a centralized approach for a determination of the commit consensus outcome for a blockchain transaction, in which only initiator PDBMS determines and communicates the commit consensus outcome to the follower PDBMSs. A centralized approach may have a single point of failure and may not tolerate malicious behavior from the initiator PDBMS. Attaching digital signatures to votes can mitigate but not eliminate the potential for malicious behavior by the initiator PDBMS in a centralized approach.

In an embodiment, a decentralized determination of a commit consensus outcome may be used. In a decentralized determination of a commit consensus outcome, the follower PDBMSs and the initiator PDBMS may independently determine the commit consensus outcome by examining the votes recorded for the blockchain transaction in their respective local replicas of the multiple member blockchains. Thus, a follower PDBMS determines the consensus outcome without waiting for a block that specifies the determination made by the initiator PDBMS of the commit consensus outcome for a blockchain transaction. In response to a follower PDBMS independently determining the commit consensus outcome for a blockchain transaction, the follower PDBMS commits the blockchain transaction locally if the commit consensus outcome is to commit or aborts the blockchain transaction if the commit consensus outcome is to not commit.

An alternative to tracking dependency on individual transactions is to track dependency on member blockchains in a conservative, coarse-grained fashion and maintain a local watermark for each member blockchain. In this alternative, each PDBMS maintains in persistent storage a low watermark (LWM) for each member blockchain in the BCA network. Every transaction on the member blockchain up to and including the LWM transaction has been applied by the PDBMS (i.e., executed and committed if the quorum consensus is to commit, or aborted or ignored if the quorum consensus is to abort). Before scheduling a blockchain transaction T for local execution, a PDBMS (or the PDBMS that added the transaction to the member blockchain) orders the dependent transactions for T appearing on each member blockchain according to their position on the member blockchain. Once the low watermark for that member blockchain points to the last dependent transaction on the member blockchain or to a later transaction on the member blockchain, blockchain transaction T has no outstanding local dependencies on the member blockchain. Once blockchain transaction T has no outstanding local dependencies on any local member blockchain, blockchain transaction T may be scheduled for local execution.

Because blockchain transactions can be initiated at multiple PDBMSs at the same time and lock rows, distributed deadlocks can result. Existing techniques for detecting or avoiding distributed deadlocks can be employed. When possible, preference can be given first to a transaction that has already been approved to commit by consensus, second to a transaction that is already in a member blockchain and is being replayed at another PDBMS, and third to a transaction that is not yet in a member blockchain.

Introduction Parallism in Blockchain Apply

A PDBMS may be replaying multiple transactions recorded in a single member blockchain and across multiple member blockchains to generate write sets. As mentioned before, the transactions are applied consistently with transactional dependency, which entails resolving transactional dependency of individual transactions. At a general level, transactional dependency resolution can be resolved by using an exhaustive approach. Exhaustive transactional dependency resolution may entail, for example, accessing and examining mappings that are maintained to track persistent data objects that are changed by transactions and the relative order in which the transactions changed the persistent data objects and the relative order in which the transactions were committed. The mappings are examined to determine whether any transaction that previously modified a persistent data object has been replayed and committed.

Novel approaches described herein for transactional dependency resolution can resolve transaction dependency for a transaction far more quickly and with less overhead than exhaustive transactional dependency resolution. The novel approaches are referred to herein as dependency checkpointing because the approaches are based on an efficiently maintained dependency checkpoint maintained at each BCA participant in a BCA network. At a high level, a dependency checkpoint is a global timestamp which is compared to transaction promotion timestamps ("promotion timestamps") associated with each persistent data object changed by a committed transaction. If a promotion timestamp of a database object is less than the dependency checkpoint, then any transaction that changed the persistent data object has already been replayed and committed. This comparison can be performed to resolve transactional dependency with much less overhead than exhaustive transactional dependency resolution.

Dependency checkpointing is based on the following features:

Timestamps: Timestamps represent a logical time or actual time and are associated with events such as changes to a persistent data object, and the starting and committing of transactions. A timestamp associated with an event represents the relative order the event occurred with respect to other events based on their timestamps. A logical timestamp, for example, is a system change number ("SCN").

Global Timestamps: Global timestamps represent a logical time or actual time across all participants in a BCA network, and is used to represent relative order of events that occur across all participants. Global timestamps may be maintained across the BCA participants using, for example, a Lamporting scheme.

Promotion timestamp: In an embodiment, a promotion time is a global timestamp representing when a transaction first changes any ledgered persistent data object. A transaction in a PSS may make a first change to a persistent data object that is not a ledgered persistent data object, and then a second change to a second persistent data object that is a ledgered persistent data object followed by a third change to a ledgered persistent data object. Each of the changes occur at different timestamps. The promotion timestamp for the transaction is the timestamp at which the second change occurred.

Object Change Metadata: A persistent data object contains attributes describing the last committed change to a persistent data object. These include a distributed transaction id (LDTXID) of the last blockchain transaction that changed the persistent data object, a last promotion time (LPTIME), which is the promotion time of the last blockchain transaction that changed the persistent data object. In an embodiment, object change metadata also includes a version number. When a transaction for a TC block changes a persistent data object, the object change metadata of the previous version of the persistent data object are included in the transaction context and the new version of the persistent data object are included in the write set.

Oldest Locally-Initiated Transaction (OLIT): At a point in time in a PDBMS, there may be uncommitted pending transactions. An OLIT is the earliest promotion time associated with any of the uncommitted pending local transactions, or if there are no uncommitted pending transactions, the timestamp of the current time. Any transaction associated with a promotion time earlier than the OLIT has terminated, i.e. aborted or committed. For a version of a persistent data object having LPTIME less than the OLIT, the transaction creating the version has committed. An OLIT depends upon only blockchain transactions that are initiated at the local PDBMS. For a particular PDBMS, blockchain transactions that are initiated at other PDBMSs do not affect the OLIT of the PDBMS.

Block OLIT (BOLIT): A TC block added to the chain includes the OLIT that existed when the leader generated the block to add to the chain. This OLIT is referred to as BOLIT. Within a member blockchain, TC blocks are added in commit time order by the leader of the member blockchain. The blockchain transaction of a given TC block in a member blockchain is committed earlier than that of any subsequent TC block in the member blockchain. For any blockchain transaction of a subsequent TC Block in the blockchain, blockchain transactions with a promotion timestamp earlier than the BOLIT of the particular TC Block have been committed or aborted.

Dependency check point clarified: Each BCA participant maintains a dependency check point associated with each member blockchain replica of the BCA participant. When a TC block in a member blockchain has been applied by a follower BCA participant and before the subsequent TC block in the member blockchain is applied, the follower BCA participant updates the dependency checkpoint to the value of the BOLIT of the just applied TC block. Applying a TC block refers to replaying the transaction context in the TC block and committing the transaction. Thus, when the subsequent TC block is applied, the follower participant can compare the LPTIME of a previous version of the persistent data object to the dependency check point to determine whether that last transaction that modified the persistent data object has been committed.

Illustrative TC Block

A TC block is described in the context of a PDBMS. According to an embodiment, a TC block in a member blockchain includes one or more block record sets. The block record set in a TC block includes a transaction context. As mentioned before, the transaction context describes the blockchain transaction for which initiator PDBMS added the TC block to a member blockchain of the initiator PDBMS. FIG. 3 depicts a TC Block according to an embodiment of the present invention.

Referring to FIG. 3, it depicts TC Block 301 in BC Log 103-L, which was proposed and added by PDBMS 110. TC Block 301 includes Block Record Set 302 and other attributes not depicted in FIG. 3. Such attributes include, for example, a block hash and a previous hash, as described in *Native Persistent Store Support For Blockchains*.

Block Record Set 302 includes Transaction Context 310, which includes fields Database Operations 312, Write Set 314, Distributed TXID 316, BOLIT 320, and TxnPromTime 322. Database Operations 312 includes the specification of database operations executed by the respective initiator PDBMS for the blockchain transaction. Write Set 314 is the write set generated by executing the database operations. Distributed TXID 316 contains the distributed txid of the blockchain transaction.

BOLIT 320 includes the BOLIT for TC Block 301. TxnPromTime 322 includes the block promotion time for the TC Block 301.

Write Set 314' is a view of Write Set 314 that depicts some of the rows therein. Write Set 314 includes row 330 and row 332. Previous versions and new versions of these rows are depicted. Rows 330 and 332 include the following columns:

PK 342: Primary key for a row. The primary keys of rows 330 and 332 are pk1 and pk2, respectively.

OtherColumns 350: These columns include changes made by the blockchain transactions. Data Columns include DML changes specified by DML statements by a client of BCA network 101.

The following columns hold object change metadata.

RowPromTime 344: LPTIME of a row. For the previous version of the row, LPTIME is the promotion time of the blockchain transaction that changed the row. For the previous versions of rows 330 and 332, RowPromTime 344 is 10:40 and 11:05. For a new version of a row, the LPTIME of the row is the block promotion time of TC Block 301. Thus, for the new version of rows 330 and 332, RowPromTime 344 is 11:10, the respective values of TxnPromTime 322. For purposes of exposition, timestamps are depicted herein as standard times of day, not logical times.

RowLDTXID 346: The last LDTXID of the LDTX that changed a row. For a new version of a row, RowLDTXID 346 is 478810, the value of Distributed TXID 316.

RowVersion 348: RowVersion 348 are version numbers of rows. In an embodiment, a version number of a row is not used for transactional dependency resolution. However, version numbers are used to more conveniently order versions of replicas of rows on a PDBMS.

Replay with Dependency Checkpointing

Figure 4:
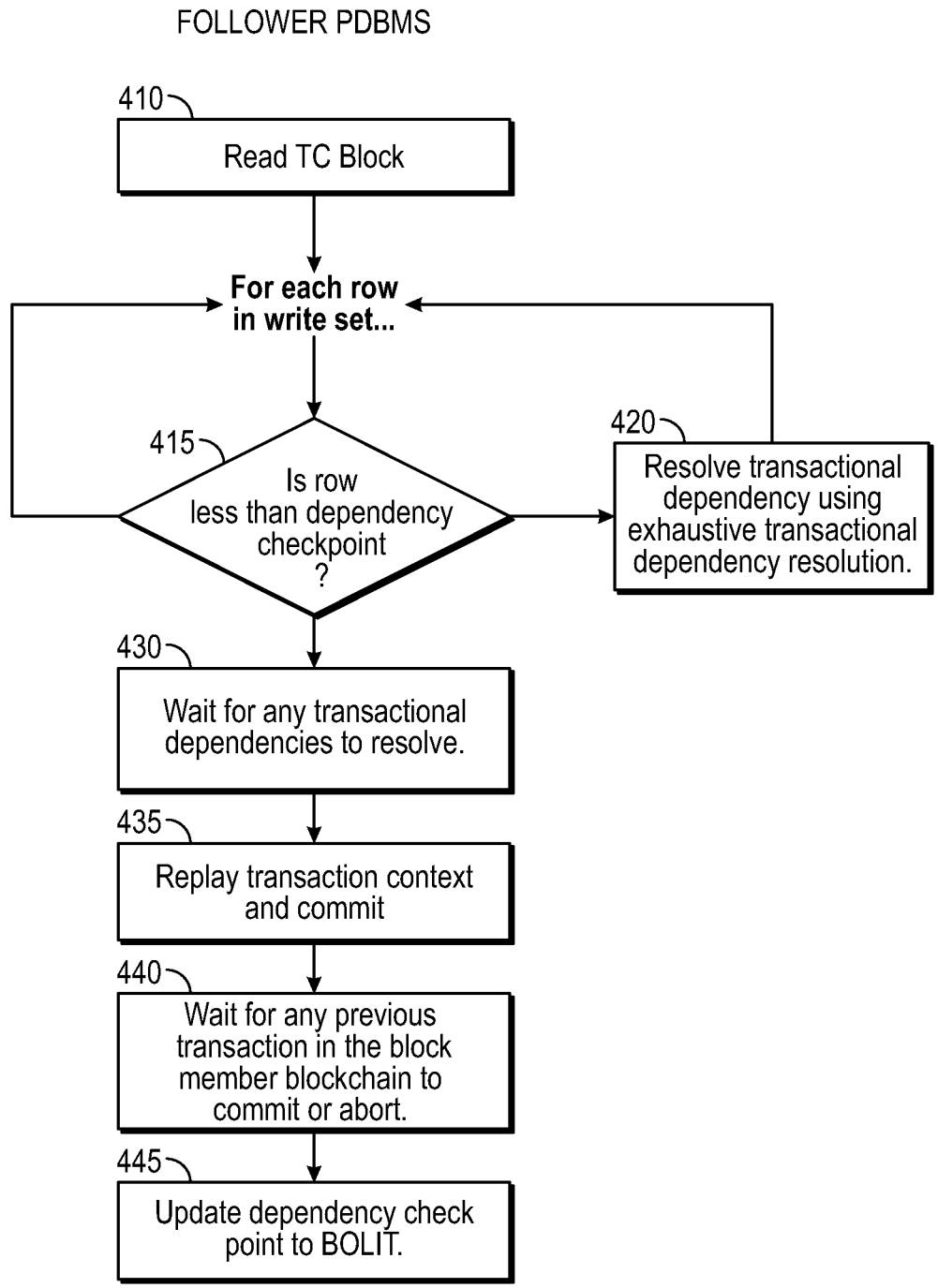
FIG. 4 is a diagram depicting blockchain apply procedure using dependency checkpointing according to an embodiment of the present invention.

FIG. 4 depicts a procedure that maybe incorporated to apply transaction contexts by a follower PDBMS using dependency checkpointing. In an embodiment, the procedure may be performed as part of operation 230 depicted in FIG. 2. The procedure is depicted using follower PDBMS 120, which is replaying TC Block 301 from replica Member BC 103-B2 in BC Log 103-L2. The dependency checkpoint is 10:55.

Referring to FIG. 4, at 410, PDBMS 120 reads TC Block 301. The following operations 415-420 are performed for each row in the Write Set 314.

At 415, PDBMS 120 determines that the LPTIME of a previous version row 330 (i.e. 10:40) is less than the dependency checkpoint of 10:55. Therefore, any previous change to row 330 has been committed, and there are no transaction dependencies for row 330. In response to this determination, another row in the write set is examined and no exhaustive transactional resolution (420) is performed for row 330.

Next, PDBMS 120 determines that the LPTIME of the previous version of row 332 (i.e. 11:05) is greater than the dependency checkpoint of 10:55. Therefore, the previous change to row 330 may not have been committed. In response to this determination, the transactional dependency of row 332 is resolved using exhaustive transactional dependency resolution.

Once all rows have been examined at operation 415, at operation 430 PDBMS 120 waits until any transactional dependencies for Write Set 314 have been resolved, i.e. any transaction upon which any row in Write Set 314 is dependent has been committed. Such waiting may entail performing further exhaustive transactional dependency resolution for any row in operation 420 determined to having or possibly having a transactional dependency on an uncommitted transaction. For example, for row 332 at operation 420, exhaustive transactional dependency resolution may have determined that row 332 depends on a transaction that changed row 332 and that has not been committed. Exhaustive transactional dependency resolution may be performed again to determine that the transaction has been committed.

Next Transaction Context 310 is replayed and committed. (435) Transaction Context 310 is replayed by replaying the database operations specified in Database Operations 312.

Finally, PDBMS 120 waits until any transaction for which there is an earlier TC block in replica Member BC 103-B2 has committed or aborted. (440) After the wait, if any, the dependency checkpoint on PDBMS 120 for replica Member BC 103-B2 is updated to the value of BOLIT 320. As a result, the dependency checkpoint is updated from 10:55 to 11:00.

Replication Timing Inconsistencies

Replicating at a persistent-object-level transactional consistency may lead to applying a row at a destination PSS before applying another row that was earlier committed at the source PSS. Such inconsistencies in the relative timing between committing at the source and applying at the destination is referred to herein as replication timing inconsistencies. Replication timing inconsistencies may create a state at the destination PSS that may not have existed on the source PSS.

Under certain conditions, replication timing inconsistencies can lead to inconsistencies and errors to enforced relationships among values in persistent data objects. Such relationships include uniqueness constraints and foreign key constraints.

Replication Timing Inconsistencies for Uniqueness Constraints

A uniqueness constraint requires any value in a column of a table to be unique relative to other values in the column. When attempting to add a duplicate value to a column that is subject to a uniqueness constraint, a PDBMS raises a uniqueness constraint violation error.

However, replication timing inconsistencies can lead to erroneous uniqueness constraint violations. Even more, replication timing inconsistencies can lead to inconsistent uniqueness constraint relationships among PDBMSs.

For example, PDBMS 110 initiates and commits blockchain transaction BT1, which inserts a row A into a ledgered table in Ledgered Tables 102-1. The value in a uniqueness constrained column of the row is 10.

PDBMS 110 initiates and commits blockchain transaction BT2 at PDBMS 110, updating the uniqueness constrained column in row A from 10 to 11. After blockchain transaction BT2 is committed, PDBMS 120 initiates and commits blockchain transaction BT3, inserting a different row B having a value in the uniqueness constrained column of 10.

PDBMS 130 was offline during execution of these three blockchain transactions. The blockchain transactions were accepted according to the commit consensus algorithm because a quorum of the PDBMSs PDBMS 110 and PDBMS 120 voted to commit these transactions. Once PDBMS 130 is online, TC blocks for blockchain transactions BT1 and BT2 are added to replica member blockchain 103-B3 and a TC block for blockchain transaction BT3 is added to replica member blockchain 104-B3.

Between the three transactions, PDBMS 130 applies blockchain transactions BT3 recorded in the TC Block for BT3 in replica member blockchain 104-B3, committing row B with the value of 10 for the uniqueness constrained column. Next, PDBMS 130 begins to apply blockchain BT1 and encounters an erroneous uniqueness constraint violation when attempting to insert row A with the value of 10 for the uniqueness constrained column.

Avoiding Replication Timing Inconsistencies for Uniqueness Constraints

One measure to use to avoid replication timing inconsistencies for a uniqueness constraint is to use "tombstoning". Tombstoning is applied when, for a uniqueness constrained column of a particular row in a table, the particular row is deleted or the value in the uniquely constrained column of a table is replaced. According to an embodiment, tombstoning preserves the deleted or replaced column value ("tombstoned value") by inserting a row into or updating a row ("tombstone row") in another table ("tombstone table").

The transaction that deleted or replaced the tombstoned value also inserts or updates the tombstone row. A subsequent transaction re-uses the tombstone value by inserting another row with the uniquely constrained column set to the tombstoned value or by updating the uniquely constrained column in the other row to the tombstoned value. The tombstone table is checked for tombstoned value in conjunction with the insert or update. In response to finding tombstoned value, the tombstone row is updated to indicate reuse of the tombstoned value or the tombstone row is deleted.

As a result, the earlier transaction that deleted or replaced the tombstoned value and subsequent transaction that re-used the tombstoned value have an "induced" transactional dependency by virtue of being made to modify the same tombstone row. Under replication based on applying transactions consistently with persistent data object level transactional dependency, the subsequent transaction will be applied later than the earlier transaction.

Figure 5:
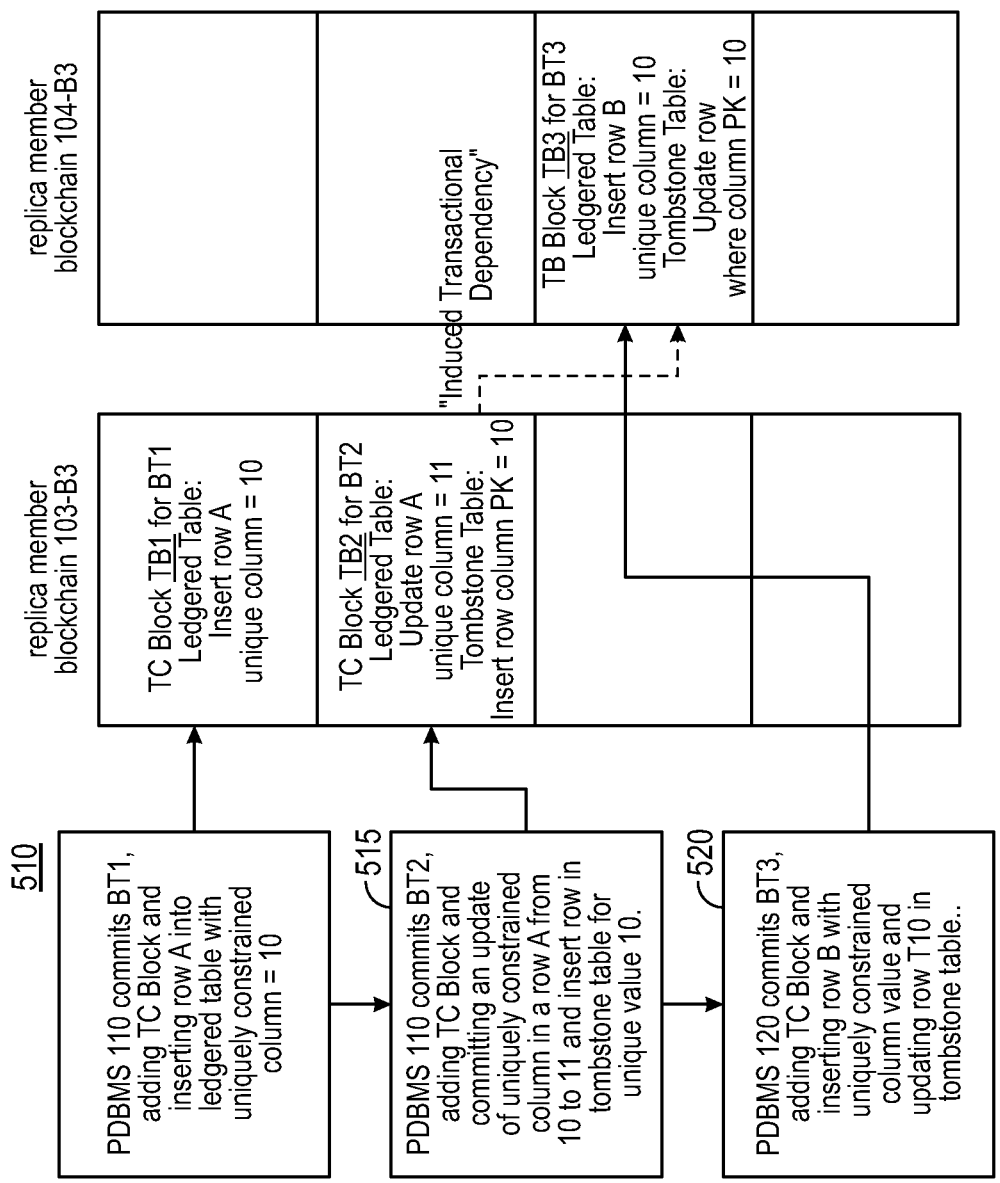
FIG. 5 is a diagram illustrating a procedure using tombstoning and induced transactional dependencies to avoid replication timing inconsistencies for unique constraints according to an embodiment.

FIG. 5 depicts an illustration of tombstoning being used to avoiding replication timing inconsistencies for a uniqueness constraint in PSS in the context of a PDBMS. The illustration is based in part on a tombstone table having a primary key column PK that is used to store tombstone values. The tombstone table also includes a column for recording distributed txids of blockchain transactions that deleted or replaced a value in a uniquely constrained column of a ledgered table. The tombstone table includes tombstone rows, each storing a tombstoned value as a primary key in PK and the distributed txid of a blockchain transaction that deleted, replaced, or reused the tombstone value in the uniquely constrained column. The distributed txid is used for exhaustive transactional dependency resolution if needed. Another column referred to as a re-used column indicates whether the tombstone value has been reused.

The illustration involves BCA network 101. PDBMS 110 and PDBMS 120 are online while PDBMS 130 is offline. PDBMS 130 will eventually come online Referring to FIG. 5, PDBMS 110 commits blockchain transaction BT1, inserting a row A into the ledgered table with a uniquely constrained column value of 10. (510) PDBMS 110 also adds a TC block TB1 for the blockchain transaction BT1 to Member Blockchain 103-B, which results in adding TC block TB1 to replica member blockchain 103-B3 when PDBMS 130 comes online.

PDBMS 110 commits blockchain transaction BT2, which updates the uniquely constrained column in row A from 10 to 11. PDBMS 110 also adds a TC block TB2 for the blockchain transaction BT2 to Member Blockchain 103-B, which results in adding TC block TB2 to replica member blockchain 103-B3 when PDBMS 130 comes online. Blockchain transaction BT2 also inserts a tombstone row into the tombstone table having a PK value of 10. The tombstone row also includes the distributed txid BT2. (515)

PDBMS 120 commits a blockchain transaction BT3, inserting a row B into the ledgered table with a uniquely constrained column value of 10. PDBMS 120 also adds a TC block TB3 for the blockchain transaction BT3 to Member Blockchain 104-B, which results in adding TC block TB3 to replica member blockchain 104-B3 when PDBMS 130 comes online. Blockchain transaction BT3 also updates re-used column in the tombstone row having PK value of 10 to mark that the value 10 has being reused as a unique value for the uniqueness constrained column. The tombstone row also includes the distributed txid BT3. (520) As a result of the updates to the tombstone row, an induced transactional dependency has been created between blockchain transactions BT2 and BT3.

Next, PDBMS 130 comes back online. PDBMS 130 begins to apply TC Block TB3 before TC Block TB1 using aggregated blockchain apply. (540)

PDBMS detects the induced transactional dependency between blockchain transaction BT3 and BT2, either indirectly through dependency checkpointing or through exhaustive transactional dependency resolution using the distributed txid BT3 recorded in the tombstone row. (545) In response to detecting the induced transactional dependency, PDBMS 130 waits to apply TC Block TB3 until TC Block TB2 is applied. Because of the transactional dependency between blockchain transaction BT2 and BT1 by virtue of both modifying row A, PDBMS 130 applies BT1 before BT2.

Various Embodiments of Tombstone Tables

In an embodiment, there is a tombstone table for each uniqueness constrained column. Instead of having a tombstone table for each uniqueness constrained column, an alternative option is to have one combined tombstone table for multiple uniqueness constrained columns, where uniqueness constrained columns have the same column type(s). The combined tombstone table for deleted or replaced unique values has a CONSTRAINT NAME column to separate values from different uniqueness constrained columns. For a multiple-column unique constraint, the multiple columns may be combined as a single binary value rather than having multiple columns in the tombstone table for each of the multiple uniqueness constrained columns. This approach permits the use of a single tombstone table for multiple uniqueness constrained columns in a set of ledgered tables regardless of the number uniqueness constrained columns and their data types.

Tombstone rows may also be garbage collected. A tombstone row may be deleted or otherwise purged from a tombstone table when the last modification to the row meets age criteria and was either an UPDATE that changed the non-NULL unique value or a DELETE of a row with a non-NULL value in the uniqueness constrained column. An example of age criteria may be based on a timestamp of the last modification stored in the column of the tombstone row. Age criteria is satisfied when an administrator-defined retention threshold for a blockchain transaction replay after point-in-time recovery (e.g., 1 week) or when, on a particular PDBMS, the timestamp is earlier than the minimum of the LWMs maintained by a PDBMS.

Replication Timing Inconsistencies for Foreign Key Constraints

A foreign key constraint on a column ("foreign key") of a table ("child table") requires that a value in the column exists as a primary key value in another table ("parent table"). Foreign key constraints can be violated when attempting to modify rows, which can cause errors. For example, attempting to insert a "child row" in a child table with a foreign key column value that does not exist as a primary key value in the parent table violates the foreign key constraint and raises an error. Likewise, attempting to update a foreign key column to a value that does not exist as a primary key in the parent table violates the foreign key constraint and raises an error. Replication timing inconsistencies can lead to foreign key violation errors.

In an illustration of replication timing inconsistencies for foreign key constraints, a ledgered table named CHILD is a child table and a ledgered table called PARENT is a parent table with respect to CHILD. PARENT and CHILD are ledgered tables of Ledgered Tables 102.

PDBMS 110 initiates blockchain transaction BT4. Blockchain transaction BT4 commits an insertion of a row into PARENT, hereafter referred to as the parent row. Next, PDBMS 120 initiates and commits blockchain transaction BT5, which inserts a child row of the parent row into CHILD. Next, PDBMS 120 initiates and commits blockchain transaction BT6, which deletes the child row in CHILD. Finally, PDBMS 110 initiates and commits blockchain transaction BT7, which deletes the parent row.

Because PDBMS 130 was offline during execution of these four blockchain transactions, the blockchain transactions were accepted according to the commit consensus algorithm because a quorum of the PDBMSs PDBMS 110 and PDBMS 120 voted to commit these transactions. Once online, PDBMS 130 adds TC blocks for blockchain transaction BT4 and BT7 to replica member blockchain 103-B3 and adds TC blocks for blockchain transaction BT5 and BT6 to replica member blockchain 104-B3.

PDBMS 130 applies blockchain transactions BT4 and BT7 first, which insert and then delete the parent row. Afterwards, PDBMS 130 attempts to apply blockchain transaction BT5 to insert the child row. However, because the parent row has been deleted, a foreign key constraint violation error is encountered.

The replication timing inconsistencies may be avoided by creating an induced transactional dependency involving a parent row when a child row is inserted and/or modified. This measure will cause any blockchain transaction creating a child row (by insert or update on the foreign key column) to be applied before any blockchain transaction deleting the parent row is deleted. Likewise, a blockchain transaction deleting or modifying the primary key of a parent is only applied after child rows have been deleted or modified to remove the foreign key relationship with the parent row. "Parent-update" conditions that trigger creating an induced transactional dependency by modifying a parent row include:

1. A child row with a non-NULL foreign key is inserted;
2. A child row with a non-NULL foreign key is deleted;
3. A child row has its foreign key changed from NULL to a non-NULL value;
4. A child row has its foreign key changed from a non-NULL value to NULL; or
5. A child row has its foreign key changed from one non-NULL value to a different non-NULL value.

Figure 6:
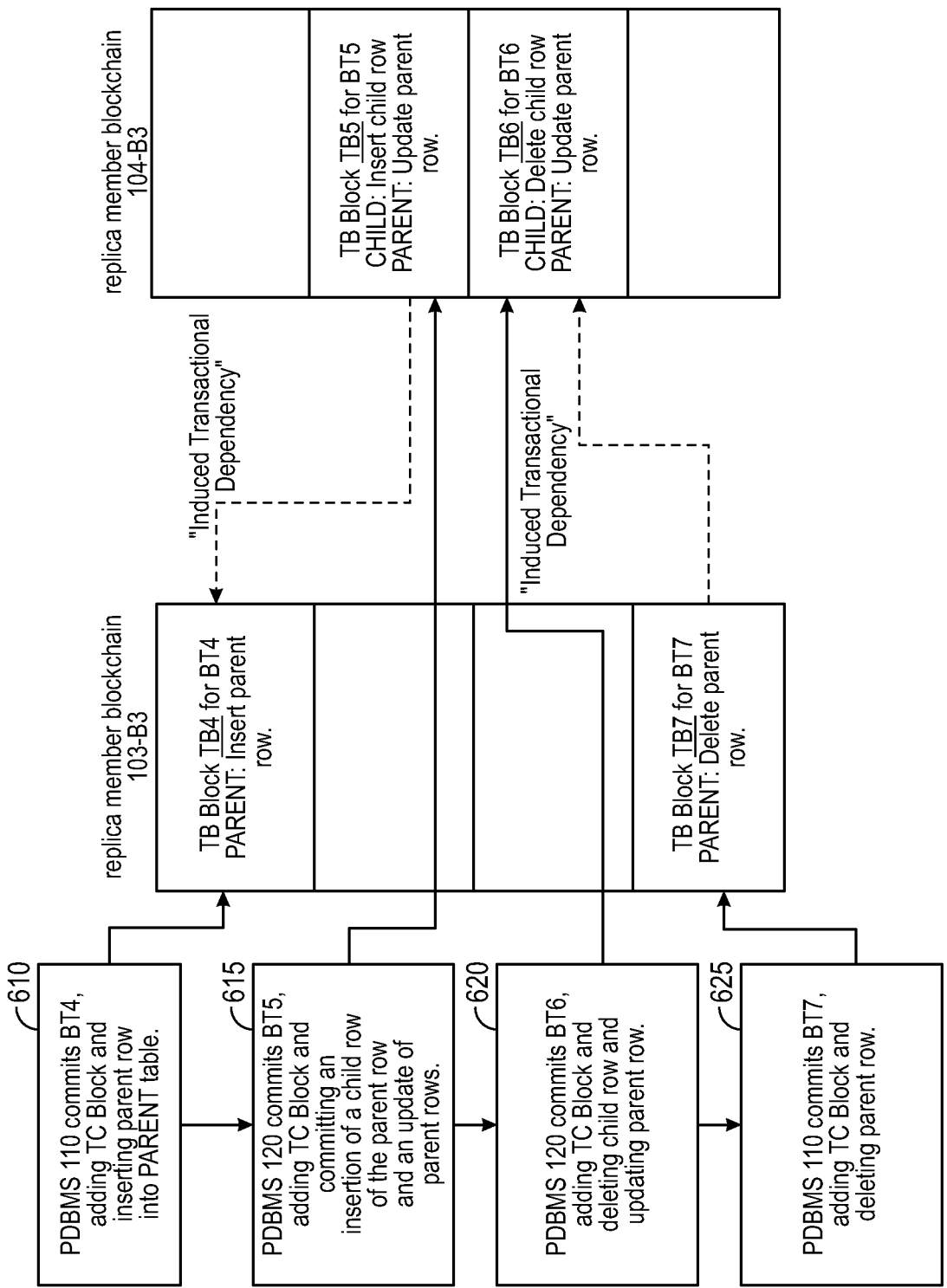
FIG. 6 is a diagram illustrating a procedure using induced transactional dependencies to avoid replication timing inconsistencies for foreign key constraints according to an embodiment.

In cases 1-4 above, one parent row is updated, while in case 5, two parent rows are updated. FIG. 6 depicts an illustration using induced transactional dependencies by updating parent rows to avoid replication timing inconsistencies. In the illustration, PDBMS 130 is offline while PDBMS 110 and PDBMS 120 execute blockchain transactions BT4, BT5, BT6, and BT7.

Referring to FIG. 6, PDBMS 110 initiates blockchain transaction BT4. Blockchain transaction BT4 commits an insertion of a parent row into PARENT, and also adds TC block TB4 for the blockchain transaction BT4 to Member Blockchain 103-B, which results in adding TC block TB4 to replica member blockchain 103-B3 when PDBMS 130 comes online. (610)

Next, PDBMS 120 initiates and commits blockchain transaction BT5, which inserts a child row into CHILD of the parent row. PDBMS 120 also adds TC block TB5 for the blockchain transaction BT5 to Member Blockchain 104-B, which results in adding TC block TB5 to replica member blockchain 104-B3 when PDBMS 130 comes online. (615)

In addition, blockchain transaction BT5 updates the parent row. This creates an induced transactional dependency between blockchain transactions BT4 and BT5 by virtue of updating the parent row, thereby ensuring BT4 is applied before BT5 to insert the parent row before the child row.

Next, PDBMS 120 initiates and commits blockchain transaction BT6, which deletes the child row in CHILD. PDBMS 120 also adds TC block TB6 for the blockchain transaction BT6 to Member Blockchain 104-B, which results in adding TC block TB6 to replica member blockchain 104-B3 when PDBMS 130 comes online. (620)

In addition, blockchain transaction BT6 updates the parent row. This update will ensure the creation of an induced transactional dependency in the event the parent row is updated or deleted subsequently, as will occur in this illustration.

Finally, PDBMS 110 initiates and commits blockchain transaction BT7, which deletes the parent row. PDBMS 110 also adds TC block TB7 for the blockchain transaction BT7 to Member Blockchain 103-B, which results in adding TC block TB7 to replica member blockchain 103-B3 when PDBMS 130 comes online. Also, as a result of blockchain transaction BT6 having updated the parent row previously, there is now an induced transactional dependency between blockchain transaction BT7 and BT6.

Once online, PDBMS 130 may be forced to apply the TC block TB4 before TB5 responsive to detecting the induced transactional dependency between blockchain transaction BT4 and BT5. This avoids inserting a child row before the parent row thereby avoiding a foreign key violation error. Similarly, PDBMS 130 may be forced to apply the TC block TB6 before TB7 responsive to detecting the induced transactional dependency between blockchain transaction BT6 and BT7. This avoids deleting a parent row before the child row is deleted, avoiding the foreign key violation.

Application to Docs

Attributes in the documents of a collection of documents in a DOCS correspond to a columns of rows in a database table. In a DOCS, a collection of documents may be a collection of XML documents and an attribute may be an element in the XML documents of the collection; a collection of documents may also be a collection of JSON documents and an attribute may be a field in the JSON documents of the collection.

An attribute in a collection of DOCS may be subject to a uniqueness constraint that requires an attribute value be unique among other attribute values in the set. Likewise a foreign key constraint on a "child" attribute of a "child" collection of DOCS may require that a child attribute value exist as a value in a "parent" attribute of a "parent" collection of documents.

Procedures for avoiding replication timing inconsistencies like those described above may be used in a DOCS. For example, a tombstone collection of documents may be used similarly to the way a tombstone table is used. When a uniqueness constrained attribute in a particular document is updated to a new value, an induced transaction dependency may be created between a document in the tombstone collection and the particular document. Similarly, when conditions similar to parent-update conditions described earlier occur with a child document, a parent document is updated.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
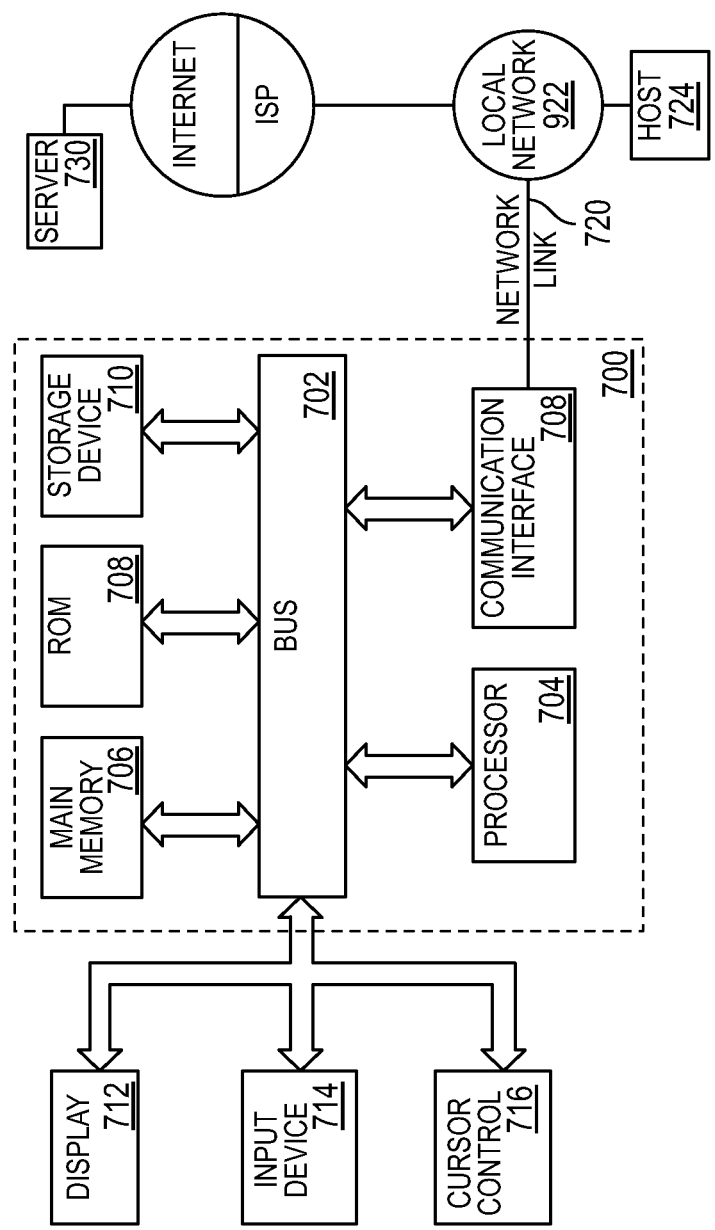
FIG. 7 is a diagram depicting a computer system that may be used to implement an embodiment of the present invention.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Software Overview

Figure 8:
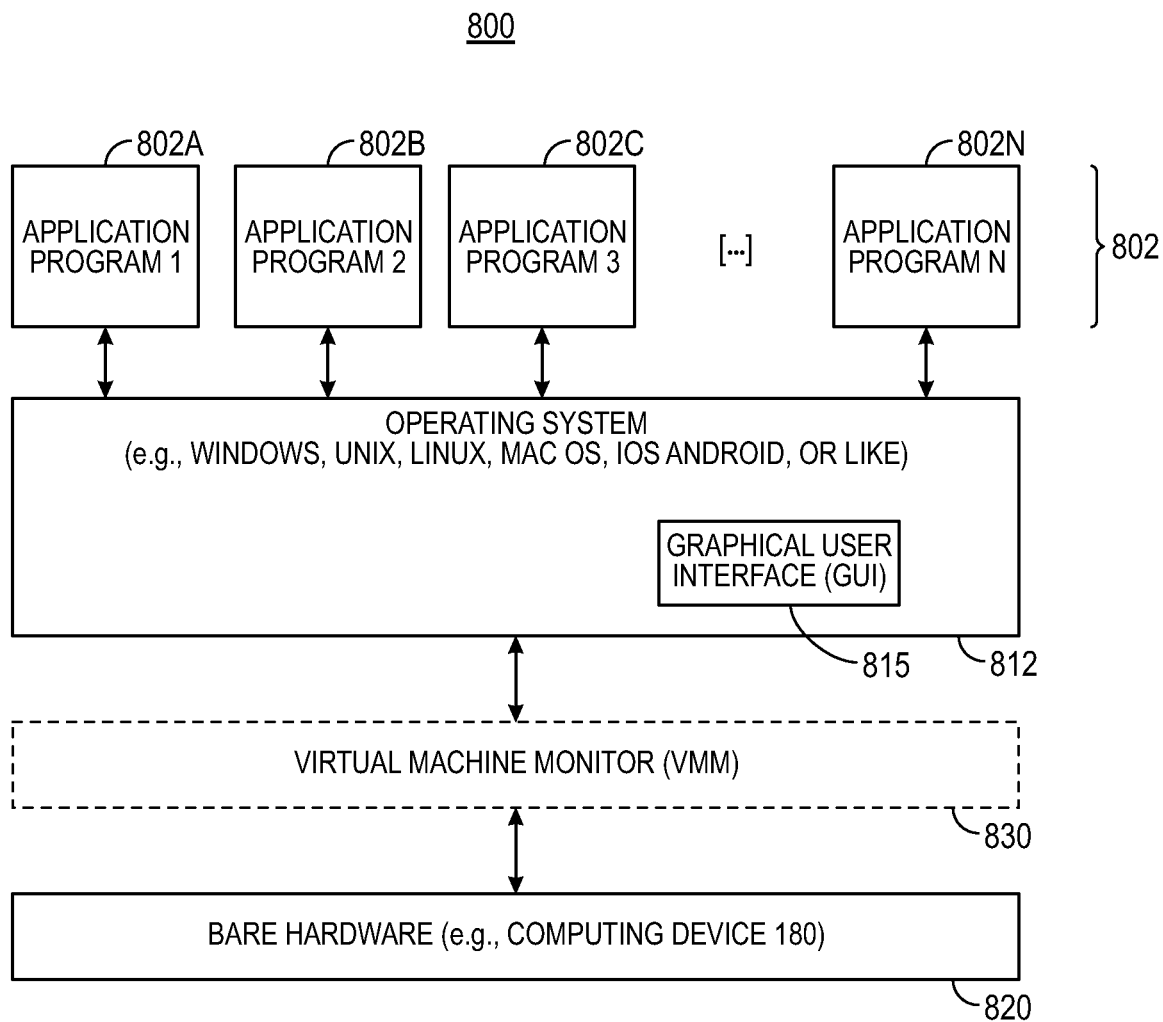
FIG. 8 depicts a software system that may be employed for controlling the operation of a computer system according to an embodiment of the present invention.

FIG. 8 is a block diagram of a basic software system 800 that may be employed for controlling the operation of computer system 700. Software system 800 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 800 is provided for directing the operation of computer system 700. Software system 800, which may be stored in system memory (RAM) 706 and on fixed storage (e.g., hard disk or flash memory) 710, includes a kernel or operating system (OS) 810.

The OS 810 manages low-level aspects of computer operation, including managing execution of processes, memory allocation, file input and output (I/O), and device I/O. One or more application programs, represented as 802A, 802B, 802C . . . 802N, may be "loaded" (e.g., transferred from fixed storage 710 into memory 706) for execution by the system 800. The applications or other software intended for use on computer system 700 may also be stored as a set of downloadable computer-executable instructions, for example, for downloading and installation from an Internet location (e.g., a Web server, an app store, or other online service).

Software system 800 includes a graphical user interface (GUI) 815, for receiving user commands and data in a graphical (e.g., "point-and-click" or "touch gesture") fashion. These inputs, in turn, may be acted upon by the system 800 in accordance with instructions from operating system 810 and/or application(s) 802. The GUI 815 also serves to display the results of operation from the OS 810 and application(s) 802, whereupon the user may supply additional inputs or terminate the session (e.g., log off).

OS 810 can execute directly on the bare hardware 820 (e.g., processor(s) 704) of computer system 700. Alternatively, a hypervisor or virtual machine monitor (VMM) 830 may be interposed between the bare hardware 820 and the OS 810. In this configuration, VMM 830 acts as a software "cushion" or virtualization layer between the OS 810 and the bare hardware 820 of the computer system 700.

VMM 830 instantiates and runs one or more virtual machine instances ("guest machines"). Each guest machine comprises a "guest" operating system, such as OS 810, and one or more applications, such as application(s) 802, designed to execute on the guest operating system. The VMM 830 presents the guest operating systems with a virtual operating platform and manages the execution of the guest operating systems.

In some instances, the VMM 830 may allow a guest operating system to run as if it is running on the bare hardware 820 of computer system 700 directly. In these instances, the same version of the guest operating system configured to execute on the bare hardware 820 directly may also execute on VMM 830 without modification or reconfiguration. In other words, VMM 830 may provide full hardware and CPU virtualization to a guest operating system in some instances.

In other instances, a guest operating system may be specially designed or configured to execute on VMM 830 for efficiency. In these instances, the guest operating system is "aware" that it executes on a virtual machine monitor. In other words, VMM 830 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

What is claimed is:

1. A method, comprising:
 a particular blockchain apply ("BCA") participant of a BCA network reading a first block from a particular blockchain replica of a particular blockchain, wherein said first block includes a particular transaction context for a particular transaction executed by an initiator BCA participant of said BCA network;
 wherein a plurality of transactions executed by said BCA network includes said particular transaction, wherein each transaction of said plurality of transactions is recorded by a blockchain of said BCA network, wherein each transaction of said plurality of transactions is associated with a respective transaction promotion time that specifies when said each transaction modified a persistent object;
 wherein said particular transaction context includes a first set of one or more records that each correspond to a respective persistent object modified by said particular transaction;
 wherein for each record of said first set of one or more records, said each record specifies a respective last promotion time that, for the respective persistent object of said each record, specifies the respective transaction promotion time of a transaction of said plurality of transactions that previously modified said respective persistent object;
 said particular BCA participant maintaining a checkpoint time, wherein said first block includes an earliest promotion time of one or more uncommitted transactions that were pending when a replica of said first block was added to a replica of said blockchain at said initiator BCA participant, wherein maintaining said checkpoint time includes changing said checkpoint time to said earliest promotion time;

making a determination that any transaction with which the particular transaction has a transactional dependency has committed;
wherein a particular record of said first set of one or more records specifies the respective last promotion time for a particular persistent object,
wherein making said determination includes determining the respective last promotion time for said particular persistent object is less than the checkpoint time.

2. The method of claim 1,
wherein a second record of said first set of one or more records specifies the respective last promotion time for a second persistent object and a transaction identifier that identifies a previous transaction that modified said second persistent object;
wherein making said determination includes determining that the respective last promotion time for said second persistent object is not less than the checkpoint time;
in response to determining the respective last promotion time for said second persistent object is not less than the checkpoint time, determining whether said previous transaction has committed based on the transaction identifier.

3. The method of claim 2, further including:
after determining that said previous transaction has committed, applying said particular transaction.

4. The method of claim 2,
wherein the first set of one or more records specify previous values and new values of attributes changed by said particular transaction at said initiator BCA participant;
wherein the method includes:
said particular BCA participant replaying said particular transaction context to generate a second set of one or more records that specify previous values and new values of attributes changed by said particular transaction at said particular BCA participant;
said particular BCA participant voting to commit said particular transaction based on a comparison of the first set of one or more records to the second set of one or more records.

5. The method of claim 1, wherein said BCA network is a network of database management systems, and said particular persistent object is a row in a database table.

6. The method of claim 1, wherein said first set of one or more records include:
a first record of said first set of one or more records that specifies a change to an attribute of a particular persistent object from a first set of persistent objects, said attribute being subject to a uniqueness constraint, said change to an attribute of said particular persistent object changing said attribute from a first value to a second value,
a second record of said first set of one or more records that specifies inserting a persistent object having an attribute set to said first value.

7. The method of claim 1, wherein said first set of one or more records include:
a first record of said first set of one or more records that specifies a change to a child attribute of a child persistent object from a first set of child persistent objects, said child attribute being subject to a foreign key constraint, said child attribute having a value equal to a primary key value of a parent persistent object;
a second record of said first set of one or more records that specifies a modification to said parent persistent object.

8. One or more non-transitory computer-readable media storing one or more sequences of instructions which, when executed by one or more processors, cause:
a particular blockchain apply ("BCA") participant of a BCA network reading a first block from a particular blockchain replica of a particular blockchain, wherein said first block includes a particular transaction context for a particular transaction executed by an initiator BCA participant of said BCA network;
wherein a plurality of transactions executed by said BCA network includes said particular transaction, wherein each transaction of said plurality of transactions is recorded by a blockchain of said BCA network, wherein each transaction of said plurality of transactions is associated with a respective transaction promotion time that specifies when said each transaction modified a persistent object;
wherein said particular transaction context includes a first set of one or more records that each correspond to a respective persistent object modified by said particular transaction;
wherein for each record of said first set of one or more records, said each record specifies a respective last promotion time that, for the respective persistent object of said each record, specifies the respective transaction promotion time of a transaction of said plurality of transactions that previously modified said respective persistent object;
said particular BCA participant maintaining a checkpoint time, wherein said first block includes an earliest promotion time of one or more uncommitted transactions that were pending when a replica of said first block was added to a replica of said blockchain at said initiator BCA participant, wherein maintaining said checkpoint time includes changing said checkpoint time to said earliest promotion time;
making a determination that any transaction with which the particular transaction has a transactional dependency has committed;
wherein a particular record of said first set of one or more records specifies the respective last promotion time for a particular persistent object, wherein making said determination includes determining the respective last promotion time for said particular persistent object is less than the checkpoint time.

9. The one or more non-transitory computer-readable media of claim 8,
wherein a second record of said first set of one or more records specifies the respective last promotion time for a second persistent object and a transaction identifier that identifies a previous transaction that modified said second persistent object;
wherein making said determination includes determining that the respective last promotion time for said second persistent object is not less than the checkpoint time;
wherein the one or more sequences of instructions include instructions that, when executed by said one or more processors, cause in response to determining the respective last promotion time for said second persistent object is not less than the checkpoint time, determining whether said previous transaction has committed based on the transaction identifier.

10. The one or more non-transitory computer-readable media of claim 9, wherein the one or more sequences of instructions include instructions that, when executed by said one or more processors, cause:

after determining that said previous transaction has committed, applying said particular transaction.

11. The one or more non-transitory computer-readable media of claim 9,
wherein the first set of one or more records specify previous values and new values of attributes changed by said particular transaction at said initiator BCA participant;
wherein the one or more sequences of instructions include instructions that, when executed by said one or more processors, cause:
said particular BCA participant replaying said particular transaction context to generate a second set of one or more records that specify previous values and new values of attributes changed by said particular transaction at said particular BCA participant;
said particular BCA participant voting to commit said particular transaction based on a comparison of the first set of one or more records to the second set of one or more records.

12. The one or more non-transitory computer-readable media of claim 8, wherein said BCA network is a network of database management systems, and said particular persistent object is a row in a database table.

13. The one or more non-transitory computer-readable media of claim 8, wherein said first set of one or more records include:
a first record of said first set of one or more records that specifies a change to an attribute of a particular persistent object from a first set of persistent objects, said attribute being subject to a uniqueness constraint, said change to an attribute of said particular persistent object changing said attribute from a first value to a second value,
a second record of said first set of one or more records that specifies inserting a persistent object having an attribute set to said first value.

14. The one or more non-transitory computer-readable media of claim 8, wherein said first set of one or more records include:
a first record of said first set of one or more records that specifies a change to a child attribute of a child persistent object from a first set of child persistent objects, said child attribute being subject to a foreign key constraint, said child attribute having a value equal to a primary key value of a parent persistent object;
a second record of said first set of one or more records that specifies a modification to said parent persistent object.

* * * * *

UNITED STATES PATENT AND TRADEMARK OFFICE
CERTIFICATE OF CORRECTION

| | | |
|---|---|---|
| PATENT NO. | : 11,875,178 B2 | |
| APPLICATION NO. | : 16/944011 | |
| DATED | : January 16, 2024 | |
| INVENTOR(S) | : Stamos et al. | |

It is certified that error appears in the above-identified patent and that said Letters Patent is hereby corrected as shown below:

On the Title Page

On page 2, Column 2, under Other Publications, Line 1, delete "Immutalilization" and insert -- Immortalization --, therefor.

In the Specification

In Column 2, Line 54, delete "parallism" and insert -- parallelism --, therefor.

In Column 3, Line 25, delete "that that" and insert -- that --, therefor.

In Column 11, Line 63, delete "Parallism" and insert -- Parallelism --, therefor.

In Column 16, Line 54, delete "online" and insert -- online. --, therefor.

Signed and Sealed this
Seventh Day of May, 2024

Katherine Kelly Vidal
*Director of the United States Patent and Trademark Office*